Patented Apr. 22, 1952

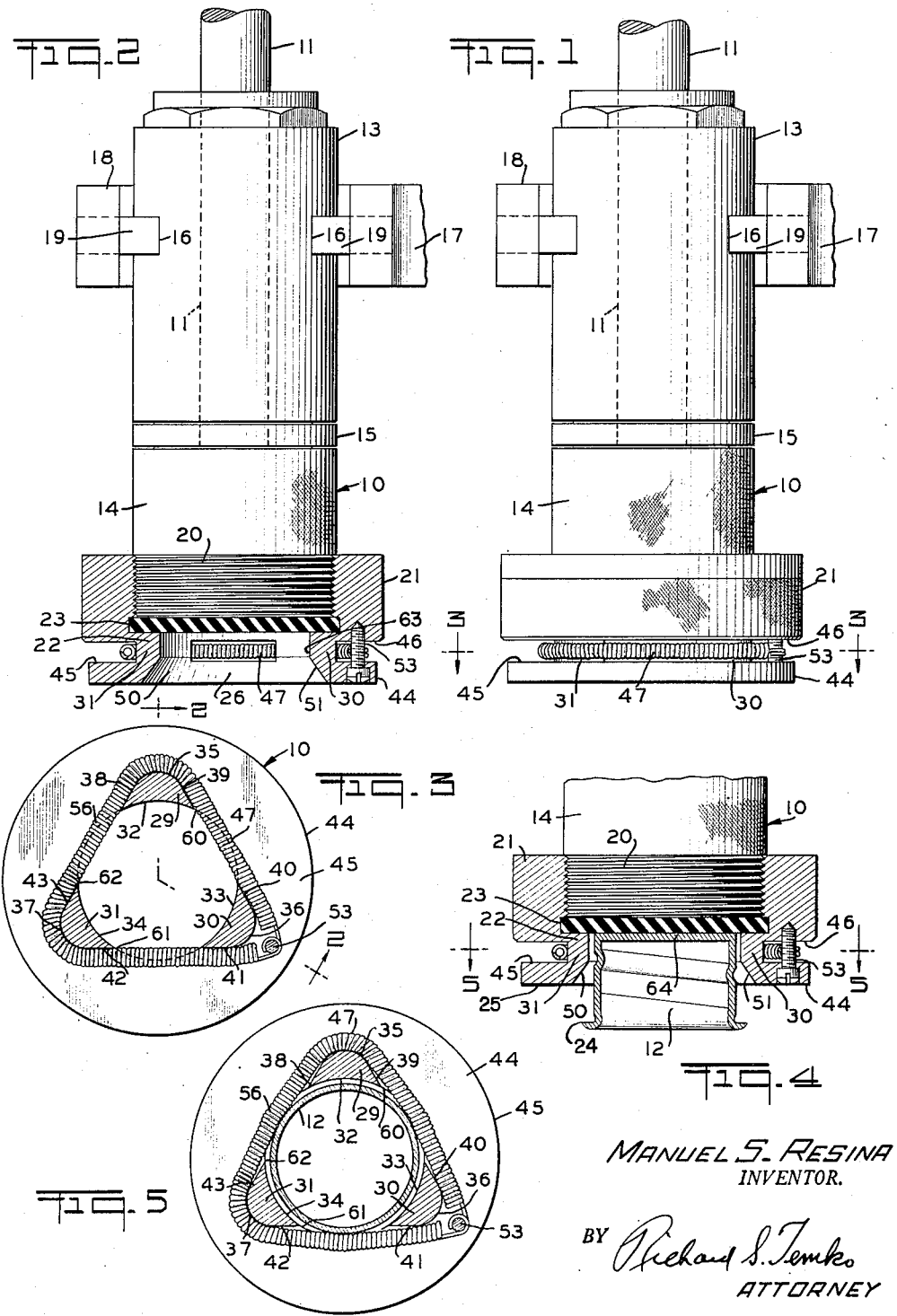
April 22, 1952 — M. S. RESINA — 2,593,794
ROTATABLE CAP APPLYING CHUCK WITH CAP GRIPPING HELICAL SPRING
Filed July 22, 1947
MANUEL S. RESINA
INVENTOR.

2,593,794

UNITED STATES PATENT OFFICE 2,593,794

ROTATABLE CAP APPLYING CHUCK WITH CAP GRIPPING HELICAL SPRING

Manuel S. Resina, Brooklyn, N. Y., Rosa Resina, executrix of said Manuel S. Resina, deceased, assignor to Resina Automatic Machinery Co. Inc., Brooklyn, N. Y., a corporation of New York Application July 22, 1947, Serial No. 762,723

3 Claims. (Cl. 226—88)

This invention relates generally to chucks and more particularly to chucks known as cap applying chucks. Such chucks find considerable utility in connection with container capping machines in which a screw cap or similar closure is temporarily gripped by the chuck and is released by the chuck after the cap or closure has been properly secured in place over the entrance to the container.

It is among the principal objects of the present invention to provide cap chuck constructions wherein the cap is frictionally engaged by the chuck, with sufficient friction so that the chuck does not become undesirably displaced from or released by the chuck and yet in which the degree of friction may be predetermined within limits so that when the chuck is used with metal caps, the lacquer or enamel coating thereon is not damaged by the gripping members, and similarly when the chuck is used with caps composed of plastic materials of a relatively fragile character, said caps are not damaged or cracked.

Another object herein lies in the provision of chuck structures of the class described, wherein upon the full and proper seating of the cap or closure with the opening or neck edge of the container with which the cap is used, the gripping action ceases and the chuck may be rotated an excessive amount without damaging the cap or container even where they are composed of relatively fragile material as for example, Bakelite and glass, respectively.

Another object herein lies in the provision of chuck structures having a cushioning element adapted to prevent crushing, deformation, or breakage of the cap or container by virtue of excess pressure in a direction toward the container in the cap locating or cap seating operations with which such chucks are customarily utilized.

In order to accomplish the foregoing novel and useful results, it is necessary and desirable that the resilient gripping elements be sensitive in character and such means have been obtained by the use of materials which are to some extent, subject to crystallization, fatigue or deterioration, due to age. It is, therefore, among the objects herein to provide structure wherein said means may be conveniently and expeditiously replaced as required by conditions of use.

Another object herein lies in the provision of structure of the class described, wherein the effective gripping pressure and its consequent friction upon the cap may be changed to suit various container capping conditions. A feature of the present invention lies in the fact that the chuck operates efficiently under long periods of continuous use and it makes accommodation for variations in size and shape of the caps such as occur in a plurality of caps when manufactured under ordinary commercial tolerances.

When chucks of the character described are utilized in connection with metallic caps, in prior art devices, uniformity of operation has been interfered with by small particles of dirt, paint, enamel, lacquer or other foreign materials, becoming lodged upon or within the ways of the chuck gripping members. Similarly, where the screw cap chuck is used with caps composed of plastic material, small chips or sprue trimmings interfere with the normal operation of the gripping members. It is, therefore, among the principal objects of the present invention to provide cap chuck construction which has self-cleaning action and yet where particularly dirty operating conditions are encountered, the cleaning of the resilient cap gripping members may be conveniently accomplished.

These objects and other incidental ends and advantages will more fully appear in the progress of this disclosure and be pointed out in the appended claims.

In the drawings in which similar reference characters designate corresponding parts throughout the several views of each embodiment:

Fig. 1 is a front fragmentary elevational view of a first embodiment of the invention.

Fig. 2 is a front elevational view corresponding generally to Fig. 1, but with the lower portion thereof in section as seen from the line 2—2 on Fig. 3.

Fig. 3 is a horizontal sectional view, as seen from the plane 3—3 on Fig. 1.

Fig. 4 is a fragmentary sectional view, partly in elevation, corresponding to the lower portion of Fig. 2, but showing the chuck engaging a cap.

Fig. 5 is a horizontal sectional view as seen from the plane 5—5 on Fig. 4.

Turning now to the embodiment of the invention illustrated in Figs. 1 to 5 inclusive, the chuck is indicated generally by the reference character 10. For the purpose of more clearly understanding the manner in which the chuck 10 is used, certain parts are shown for mounting and rotating the same and these correspond to similar parts disclosed in my co-pending application, Serial No. 582,233, filed March 12, 1945, now Patent Number 2,434,053, dated January 6, 1948. The shaft 11 is adapted to be rotated in such a direction that when the cap 12 is in the chuck, it may be turned so as to threadedly engage said cap upon the threaded neck of a bottle or similar container (not shown).

A vertical bushing member 13 rotationally engages the shaft 11 above the body member 14, and has the ball bearing member 15 positioned between the body member 14 and the bushing member 13. The bushing member 13 is provided with a pair of parallel horizontal grooves 16 formed therein. The chuck oscillating arm is indicated by reference character 17. The forward end of the arm 17 is forked at 18, and said fork has a pair of parallel bar members 19 pivotally mounted at the end of said fork members, said bar members engaging the bushing grooves 16.

Depending from the flange 22 are a plurality of supports 29, 30 and 31. The supports 29–31 have inner concave surfaces 32, 33 and 34 and outer convex portions 35, 36 and 37. Extending inwardly of the device, and on both sides of the convex portions 35, 36 and 37 are the substantially planar portions 38—39, 40—41 and 42—43, respectively. Extending below and radiating outwardly from the supports 29–31 is a bottom rim 44. The upper surface 45 is preferably parallel with the lower surface 46 of the sleeve member 21. The surface 45 is preferably spaced from the surface 46 a distance slightly greater than the diameter of the spring element 47 so that the spring element may have free movement between the surfaces 45 and 46. The inner surface 50 of the rim 44 is upwardly and inwardly tapered and this is also true, as shown at 51, of the supports 29–31. Thus, the tapered portions 50 and 51, as well as the inner concave surfaces 32, 33 and 34, as well as the lower surface of the cushion 23, form a socket 26.

Removably disposed between the lower rim 44 and the lower portion 46 of the sleeve member 21 is an anchoring element 53. The element is preferably a machine screw which freely penetrates a suitably positioned orifice in the rim 44 and threadedly engages a correspondingly positioned orifice in the sleeve member 21.

The spring element 47 is of the helical type and is contractile in character. Depending upon the amount of gripping ability desired, said spring may be in an unstressed condition, with the individual convolutions 56 in contact with each other or said spring may be pretensioned. As previously stated, the effective external diameter of the convolutions 56 is less than the distance between the surface 45 and the surface 46 and the length of the spring element 47 is preferably a length equal to the circumferential distance starting at the anchoring element 53 continuing around the supports 30, 31 and 29 going in a clockwise direction and ending at the anchoring element 53. Allowance is made for the free ends of the spring where they are secured to the anchoring element 53.

By virtue of the arrangement of the parts as shown and described, the spring element 47 projects into the socket 26 through the openings 60, 61 and 62. The openings 60–62 are bounded at the ends thereof by the outer ends of the concave surfaces 32–34 at the lower edges thereof by the juncture of the surface 45 with the inner surface 50 and at the upper edges thereof by the juncture of the surface 46 with the upper cylindrical portion 63 of the socket 26.

In one manner of use, the cap applying chuck 10 may be caused to periodically move up and down by suitable means such as a cam (not shown) through the arm 17, the vertical movement of said chuck being from its topmost position down to a cap receiving position, up to its topmost position, down to a cap applying position and thence back to its topmost position. When the chuck 10 comes down and engages a cap such as the cap 12, held on a suitable holder (not shown), the spring element 47 resiliently grips the cap and lifts it from the said holder, which holder may then be moved from the path of the chuck. Thereafter, the rotating chuck, driven by rotated means (not shown), moves downwardly and applies the held cap 12 to a bottle (not shown) held in position, and when the cap has been sufficiently secured, the spring element 47 is forced outwardly, thus causing slippage between the chuck 10 and the cap 12. The spring element 47 may be distended sufficiently so that after the cap has been applied, the chuck returns to the upper position thereof and is ready to begin another cycle The gasket 23 operates as a resilient member performing a number of functions First, it forms an auxiliary gripping means which engages the upper surface of the top wall 64 of the cap 12, thereby requiring less effective frictional engagement between the spring element 47 and the outer surface of the cylindrical side wall of the cap. By virtue of the greater distribution of frictional effect thus obtained, the surface pressure at the points of contact between the spring element 47 and the cap may be reduced with a consequently greater sensitivity of the chuck and less likelihood of damage to the cap. Second, the resilient member or gasket 23 allows for some variations in movement of the arm 17 without damaging the cap, since effective engagement between the chuck and the cap may be obtained even when the lower rim 24 of the cap 12 does not engage the lowermost surface 25 of the rim 44. Third, the resilient member 23 also has a frictional action between the lowermost surface of the body member 14 and the upper surface of the flange 22 so that the sleeve member 21 may be axially rotated to vary the effective length of the chuck and hence the point at which the lower surface 25 of the rim 44 will engage the upper surface of the lower rim 24 where the cap is of such height that the rim of said cap may be engaged at all.

Constant flexing of the springs causes the convolutions thereof to separate slightly so that dirt, grit, paint chippings or other foreign particles are released to fall away from the chuck by gravity and by centrifugal force as the chuck is rotated. Should undue wear occur, or after a considerable period of use, the gripping element 47 may be replaced in a convenient manner. The screw 53 is removed and the gripping element 47 is then free of connection. Replacement is made by nesting the new element 47 in place, first by securing one free end of the spring gripping element 47 on the anchoring element 53, then winding the element 47 around the supports 30, 31, and 29, and then securing the remaining free end of the element 47 to the anchoring element 53. The simple and convenient manner of replacing spring elements when desired in the aforementioned manner requires no special tools and affords a relatively fast change of springs. Thus, a chuck requiring a change of spring element may be quickly serviced and saving the machine from long time-consuming stoppages and production may continue practically uninterrupted.

It may thus be seen that I have provided novel and useful screw cap constructions which, by virtue of the simplicity thereof, are easily constructed at relatively low cost and are substantially fool-proof in operation. By virtue of the sensitivity of action thereof, fragile or caps with delicate coatings may be handled with a minimum of breakage and marring. When change in spring gripping strength of the spring gripping elements is needed to vary the effective gripping pressure thereof, this is readily accomplished in a simple manner.

I wish it to be understood that I do not desire to be limited to the exact details of construction shown and described, for obvious modifications will occur to a person skilled in the art.

I claim:

1. In a machine of the character described, a rotating cap applying chuck, said chuck comprising: a body member having a socket formed therein including a cylindrical wall portion; said wall portion having an opening radiating outwardly from the wall surrounding the socket; cap gripping means located within said opening and having a portion thereof projected through said opening and into said socket; said means being of elongated shape in the form of a single helical spring and disposed so that the innermost surface thereof with respect to said body element is, in a normal position of said means tangential to an imaginary cylinder concentrically disposed with respect to the axis of rotation of the chuck and of a diameter less than the diameter of the cylindrical wall portion; said spring being detachably connected at its ends to said body member.

2. In a machine of the character described, a rotating cap applying chuck, said chuck comprising: a body member having a socket formed therein including a cylindrical wall portion; said wall portion having an opening radiating outwardly from the wall surrounding the socket; cap gripping means located within said opening and having a portion thereof projected through said opening and into said socket; said means being of elongated shape in the form of a single helical spring and disposed so that the innermost surface thereof with respect to said body element is, in a normal position of said means, tangential to an imaginary cylinder concentrically disposed with respect to the axis of rotation of the chuck and of a diameter less than the diameter of the cylindrical wall portion; anchoring means; said spring being detachably connected at its ends to said anchoring means which is detachably connected to said body member.

3. In a machine of the character described, a rotating cap applying chuck, said chuck comprising: a body member having a socket formed therein including a cylindrical wall portion; said wall portion having an opening radiating outwardly from the wall surrounding the socket; cap gripping means located within said opening and having a portion thereof projected through said opening and into said socket; said means being of elongated shape in the form of a single helical spring and disposed so that the innermost surface thereof with respect to said body element is, in a normal position of said means, tangential to an imaginary cylinder concentrically disposed with respect to the axis of rotation of the chuck and of a diameter less than the diameter of the cylindrical wall portion; said spring inwardly of its ends being in slidable contact with said body and distributing itself about said body so as to provide substantially equal tension in the convolutions thereof.

MANUEL S. RESINA.

REFERENCES CITED

The following references are of record in the file of this patent:

UNITED STATES PATENTS

| Number | Name | Date |
|---|---|---|
| 883,128 | Bond | Mar. 24, 1908 |
| 1,742,496 | Cundall | Jan. 7, 1930 |
| 2,212,712 | Klein et al. | Aug. 27, 1940 |
| 2,326,284 | Browne | Aug. 10, 1943 |
| 2,409,899 | Resina | Oct. 22, 1946 |

FOREIGN PATENTS

| Number | Country | Date |
|---|---|---|
| 2,550 | Great Britain | Nov. 14, 1890 |
| 555,452 | Great Britain | Aug. 24, 1943 |